(12) United States Patent
Kooima

(10) Patent No.: US 7,290,341 B2
(45) Date of Patent: Nov. 6, 2007

(54) BEVELED EDGE THIN CUTTING KNIFE

(76) Inventor: Phillip Kooima, 2638 310th St., Rock Valley, IA (US) 51247

( * ) Notice: Subject to any disclaimer, the term of this patent is extended or adjusted under 35 U.S.C. 154(b) by 0 days.

(21) Appl. No.: 11/120,520

(22) Filed: Apr. 29, 2005

(65) Prior Publication Data

US 2006/0242845 A1    Nov. 2, 2006

(51) Int. Cl.
*B27B 33/02* (2006.01)
(52) U.S. Cl. ............... 30/355; 30/356; 30/357; 83/835; 83/847
(58) Field of Classification Search ............ 30/355, 30/356, 367; 83/835–855; 56/295
See application file for complete search history.

(56) References Cited

U.S. PATENT DOCUMENTS

| | | | | |
|---|---|---|---|---|
| 276,951 A | * | 5/1883 | Baker | 30/355 |
| 1,929,838 A | * | 10/1933 | Crane | 30/355 |
| 3,022,621 A | * | 2/1962 | Zavarella | 56/295 |
| 4,802,396 A | * | 2/1989 | Kuklinski | 83/849 |
| 6,367,533 B1 | * | 4/2002 | Pitzen | 156/527 |

* cited by examiner

*Primary Examiner*—Boyer D. Ashley
*Assistant Examiner*—Carolyn T Blake
(74) *Attorney, Agent, or Firm*—Jeffrey A. Proehl; Woods Fuller Shultz & Smith

(57) ABSTRACT

A knife is disclosed for cutting crop materials, and includes a base portion having an interior edge and a pair of end edges. The base portion has an exterior region opposite the interior edge and has opposite major faces. The knife further includes a plurality of teeth extending from the base portion, with each tooth being defined by a perimeter edge. The perimeter edge of the tooth includes a leading edge portion and a transition edge portion extending between the leading edge portion of the tooth and an adjacent tooth. The leading edge portion is formed by a leading edge surface lying substantially in a plane that is oriented at a first bevel angle with respect to one of the major faces. The transition edge portion is formed by a transition edge surface that is oriented with respect to one of the major faces at a second bevel angle.

20 Claims, 6 Drawing Sheets

BEVELED EDGE THIN CUTTING KNIFE

BACKGROUND OF THE INVENTION

1. Field of the Invention

The present invention relates to knifes for cutting and chopping crop materials, and more particularly pertains to a new beveled edge thin cutting knife for increasing the cutting effectiveness of agricultural crop harvesting and processing equipment.

2. Description of the Prior Art

Crop harvesting machines, such as combines and forage harvesters, often employ "heads" mounted on the front of the machinery to gather and cut the plant as it stands in the field at harvest time. Some types of heads, such as a head designed for use in the harvest of corn, includes a number of snouts, or finger-like structures that extend forwardly of the machine, to guide and gather the plants as they stand in rows in the field. The corn head also includes a number of knifes or blades that cut the upper portion of the plant off from the lower portion of the plant as the plant moves between the snouts, so that the upper portion of the plant can be processed by the combine while the lower portion of the plant remains in the field. The knives may be relatively thin, in that the thickness of the material used to form the knife is approximately 7 gauge steel sheet (approximately 0.179 inches) or thinner, with many of these knives having a thickness of 10 gauge (approximately 0.135 inches) or 12 gauge (approximately 0.104 inches). However, due to the relative thinness of the material used to form the knife, it has been relatively difficult, if not impossible, to effectively and economically produce a relatively sharp cutting edge on these knives for use on agricultural crop processing machinery. As a result, knifes formed out of material formed out of approximately 7 gauge or thinner material have not received a sharpened edge, and have featured a blunt cutting edge with a surface that extends substantially perpendicularly to the broad side faces of the knife for the full thickness of the knife material, such as is shown in FIGS. 1 and 2 of the drawings. The blunt cutting edge on the known thin knifes is not completely ineffective, as the relatively thin nature of the knife material and the teeth formed on the knife tend to do an acceptable job of cutting the crop material.

In particular, it has been established that it is relatively difficult to effectively and economically form a tapered or beveled edge onto the relatively thin material of these knives in the conventional manner for shaping knives formed of material thicker than 7 gauge, which is to using a milling machine. Further, when such milling is attempted, a relatively sharp and confined corner is necessarily created between adjacent teeth on the knife. In practical use of a knife formed using the milling technique, the sharp corner formed by the mill collects, and easily becomes clogged with, the crop materials that are being cut. This collection of crop material on the knife tends to reduce the effectiveness of the cutting capability of the adjacent teeth as the crop material is blocked from coming into contact with the blunt cutting edge.

Thus, there has been a need to improve upon the cutting effectiveness of the known blunt-edged thin cutting knifes, despite the problems that have been encountered in attempting to produce such knifes, in order to facilitate the cutting of crops in a manner that is more effective and efficient, and that requires less power to operate the crop processing apparatus.

SUMMARY OF THE INVENTION

In view of the foregoing disadvantages inherent in the known types of knifes for cutting and chopping crop materials now present in the prior art, the present invention provides a new beveled edge thin cutting knife wherein the same can be utilized for increasing the cutting effectiveness of agricultural crop harvesting and processing equipment.

To attain this, the present invention generally comprises a knife for cutting crop materials which comprises a base portion and a plurality of teeth on the base portion. The base portion has an interior edge, a pair of end edges, and an exterior region located opposite of the interior edge. The knife also has opposite major faces. The plurality of teeth extends from the base portion, with each tooth being defined by a perimeter edge. The perimeter edge of the tooth includes a leading edge portion and a transition edge portion extending between the leading edge portion of the tooth and an adjacent tooth. The leading edge portion is formed by a leading edge surface lying substantially in a plane that is oriented at a first bevel angle with respect to one of the major faces. The transition edge portion is formed by a transition edge surface that is oriented with respect to one of the major faces at a second bevel angle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the formation of a relatively sharp edge on a relatively thin blade material in a manner that does not produce sharp interior corners that catch and collect crop materials, thus reducing the effectiveness of the cutting action.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
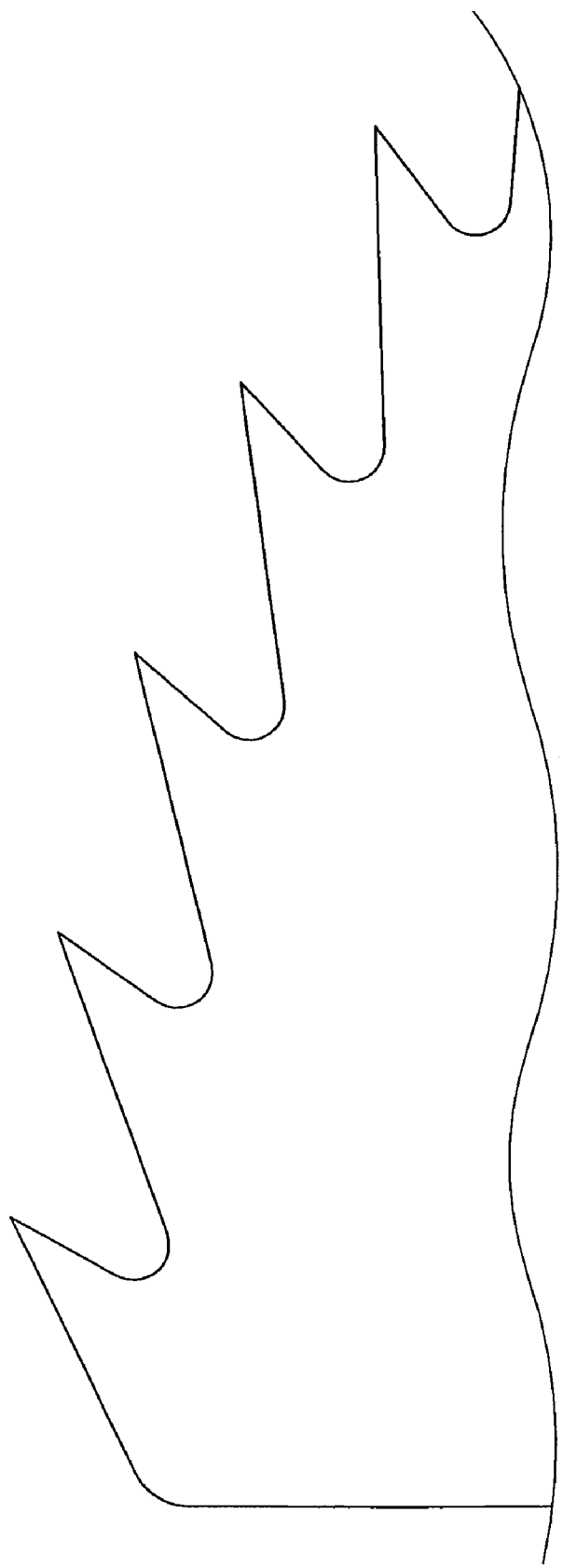
FIG. 1 is a schematic side view of a prior art knife
Figure 2:
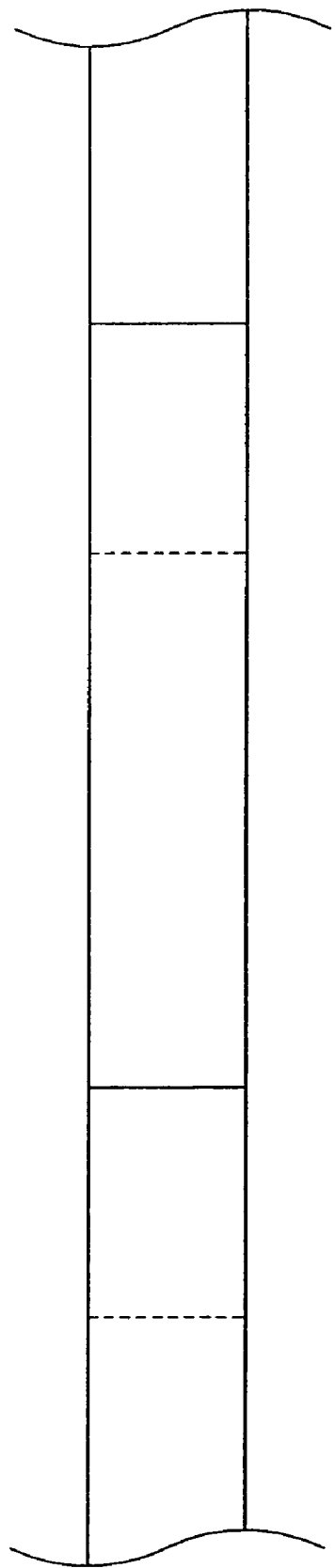
FIG. 2 is a schematic top edge view of the prior art knife on FIG. 1.
Figure 3:
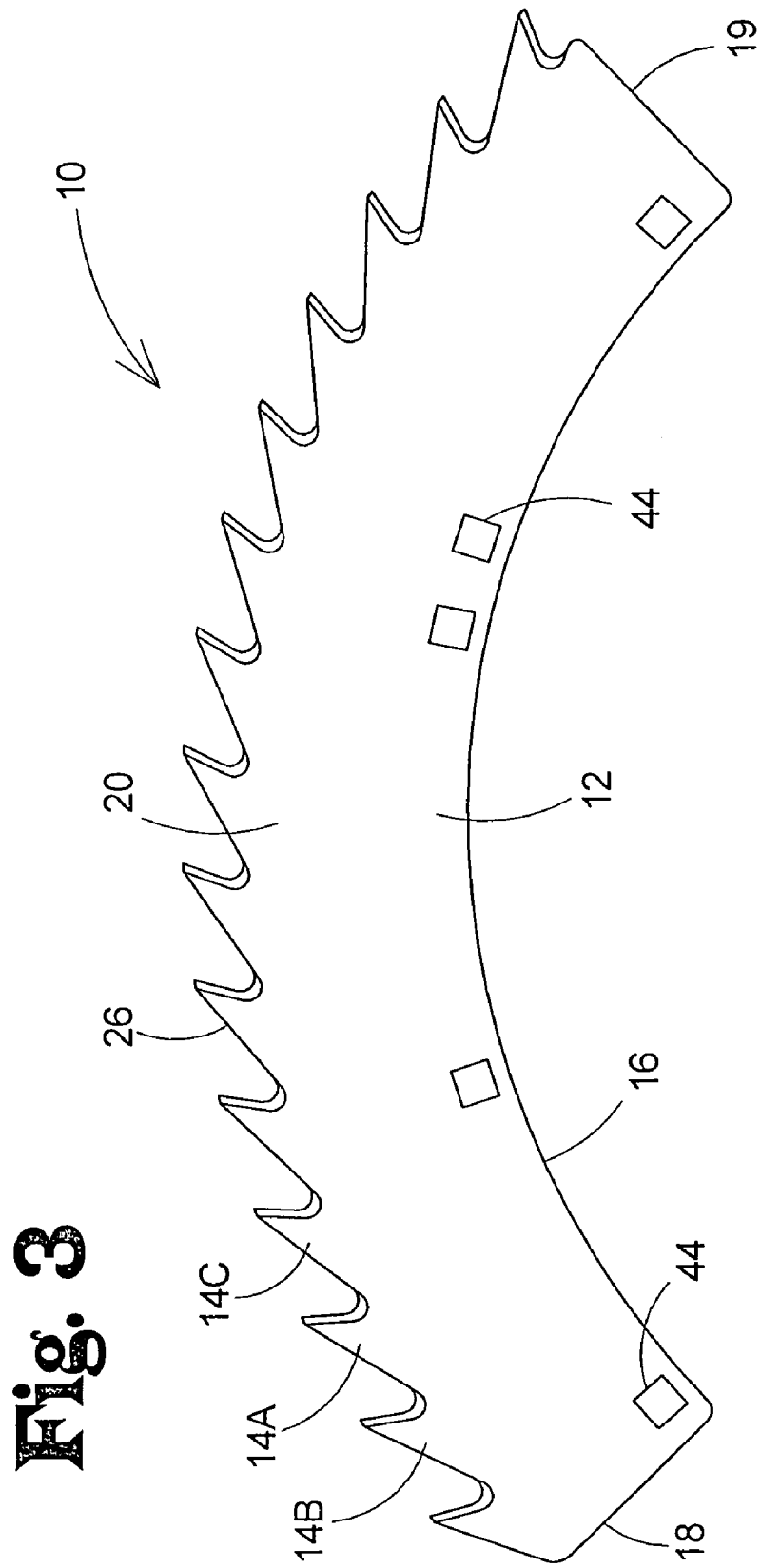
FIG. 3 is a schematic side view of a new beveled edge thin cutting knife according to the present invention.
Figure 4:
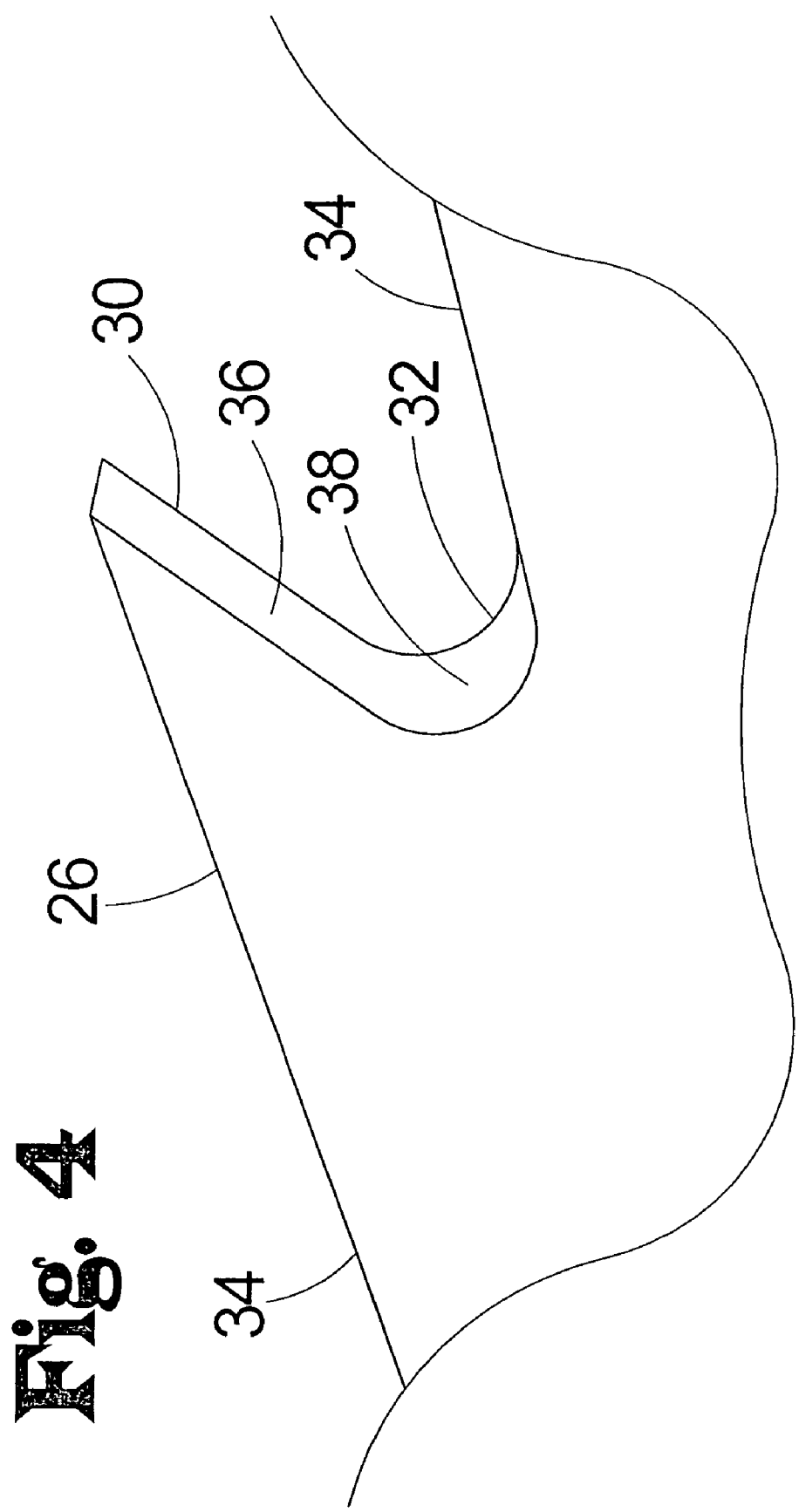
FIG. 4 is a schematic enlarged side view of a single tooth of the beveled edge thin cutting knife of the present invention.

With reference now to the drawings, and in particular to FIGS. 3 through 6 thereof, a new beveled edge thin cutting knife embodying the principles and concepts of the present invention and generally designated by the reference numeral 10 will be described.

As best illustrated in FIGS. 3 through 6, the beveled edge thin cutting knife 10 generally comprises a knife for mounting on a harvesting apparatus that is employed to cut and process a crop material, such as, for example, corn materials and the like.

The knife 10 includes a base portion 12 and a plurality of teeth 14a, 14b, 14c that each extend from the base portion. The base portion 12 has an interior edge 16 and a pair of end edges 18, 19. The base portion 12 has an exterior region 20 that is located opposite of the interior edge 16. The base portion 12 has opposite major faces 22, 24, which are oriented substantially parallel to each other. One of the major faces is an upper major face 22 for orienting in an upward direction when installed in a mixer apparatus and the other one of the major faces is a lower major face 24 for orienting in a downward direction when installed in a mixer apparatus. The material has a thickness between the major faces that is equal to or less than approximately 7 gauge (approximately 0.179 inches and approximately 4.5 mm), and is especially suitable for knives formed out of material of 10 gauge (approximately 0.135 inches and approximately 3.4 mm) thickness and 12 gauge (approximately 0.0.104 inches and approximately 2.6 mm) or less. The base portion 12 may be formed of a metal material, such as steel sheet, although other materials may also be employed.

The plurality of teeth 14 form another portion of the knife 10 and extend from the exterior region 20 of the base portion 12. Each tooth 14 of the plurality of teeth is defined by a perimeter edge 26, which includes a number of relatively distinct sections or portions. The perimeter edge 26 of a tooth 14 generally includes a leading edge portion 30, a transition edge portion 32, and a trailing edge portion 34.

Figure 5:
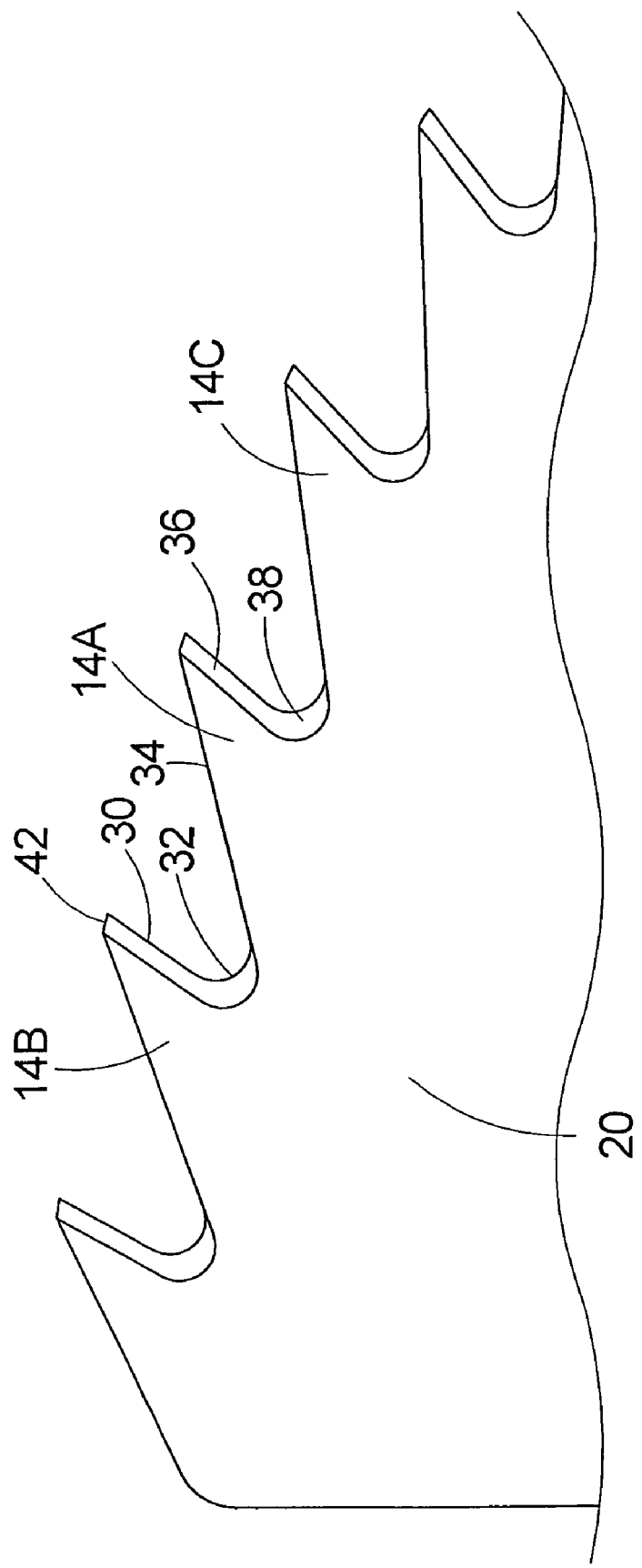
FIG. 5 is a schematic side view of a number of adjacent teeth on the beveled edge thin cutting knife of the present invention.
Figure 6:
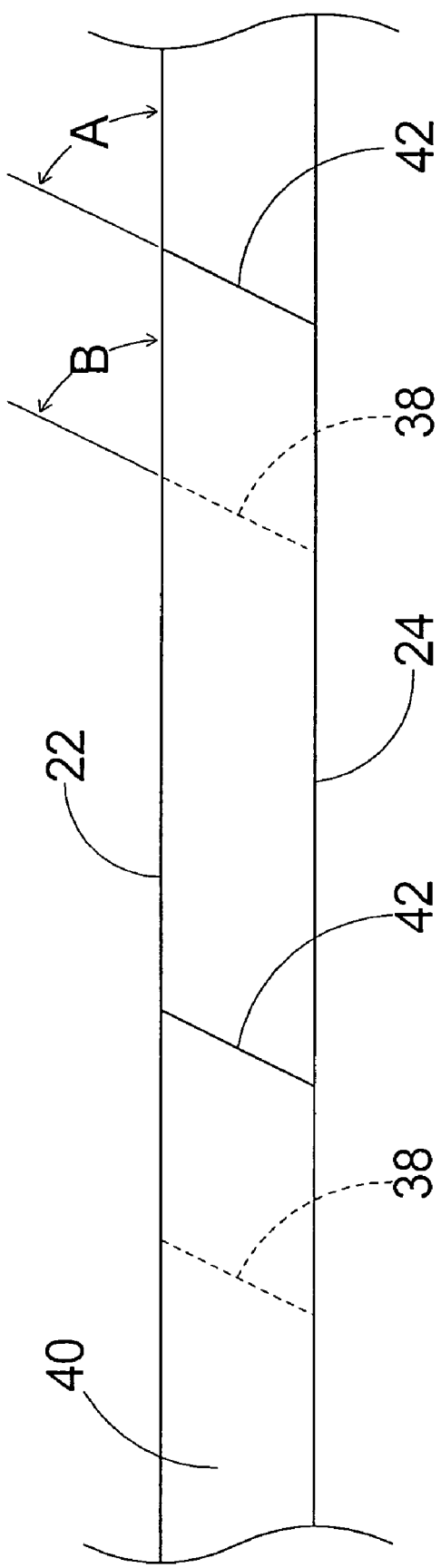
FIG. 6 is a schematic edge view of the beveled edge thin cutting knife of the present invention.

The leading edge portion 30 provides most of the cutting function of the tooth 14 a, and is generally oriented toward the direction of movement or rotation of the knife 12. The leading edge portion 30 is formed by a leading edge surface 36, which extends between the major faces 22, 24 of the knife 12. Significantly, the leading edge surface 36 lies substantially in a plane that is oriented at a first bevel angle A with respect to the upper major face 22, so that a sharpened ridge is formed at the intersection of the leading edge surface 36 and the lower major face 24. The first bevel angle A is greater than zero degrees and less than 90 degrees, and may range between approximately 30 degrees and approximately 60 degrees. In one preferred embodiment of the invention the first bevel angle A measures approximately 45 degrees with respect to the upper major face 22. The leading edge portion 30 may be substantially straight when viewed in a side profile of the tooth 14, such as is shown in FIG. 5 of the drawings.

The transition edge portion 32 extends generally between the leading edge portion 30 of the tooth 14a and an adjacent tooth 14c of the plurality of teeth. More particularly, the transition edge portion 32 is positioned between the leading edge portion 30 of the tooth 14a and the trailing edge portion 34 of an adjacent tooth 14c. The transition edge portion 32 is formed by a transition edge surface 38, which extends between the major faces 22, 24 of the knife 12. The transition edge surface 38 may also be inclined with respect to the major faces 22, 24. The transition edge portion 32 is preferably substantially curved in a side profile of the tooth 14, such as that shown in FIG. 5. The transition edge surface 38 extends from the upper major face 22 at a second bevel angle B with respect to the upper major face. The second bevel angle B is greater than zero degrees and less than 90 degrees in measure with respect to the upper major face 22. In a preferred embodiment, the second bevel angle B measures approximately 45 degrees with respect to the upper major face. Preferably, the second bevel angle B is substantially equal to the first bevel angle A.

The trailing edge portion 34 of the tooth 14 is generally directed away from the direction of travel of the knife 10. The trailing edge portion 34 extends between the leading edge portion 30 of a tooth 14a and an adjacent tooth 14b of the plurality of teeth, and the trailing edge portion may extend between the leading edge portion and the transition edge portion 32 of adjacent tooth 14b. The trailing edge portion 34 is formed by a trailing edge surface 40, which extends between the major faces 22, 24 of the knife 12. The trailing edge surface 40 is oriented substantially perpendicular to the major faces 22, 24.

A tip 42 on the tooth 14 is located at a juncture of the leading edge portion 30 and the trailing edge portion 34, and may be a relatively sharp transition between these portions of the perimeter edge 26. The tip 42 defines a tip line or axis that extends between the major faces 22, 24 of the knife 12, and the tip line may be oriented at a non-perpendicular angle with respect to the major faces. The angle of the tip line with respect to the upper major face 22 may be approximately equal to the first bevel angle A.

In some embodiments of the invention, a layer of carbide material may optionally be applied to a portion of at least one of the major faces 22, 24 of the base portion 12 and the plurality of teeth 14a, 14b, 14c. Typically, the layer of carbide will be applied to the lower major face 24 of the knife 10.

The knife 10 may also be provided with one or more mounting apertures 44 for receiving fasteners that removably fasten the knife 10 to the agricultural machinery apparatus. Such apertures 44 may be positioned in any arrangement, although illustratively the apertures are located along the interior edge 16.

One highly significant aspect of the invention is the manner in which the beveled or sharpened edge is formed on the relatively thin material used to form the knife 10. As previously discussed, the use of milling apparatus to attempt to form the beveled edge has proved highly unsatisfactory, as the thin material is somewhat flexible when subjected to milling, but more importantly the milling process produces a sharp and confined interior corner or crotch between adjacent teeth that functions to collect crop materials rather than easily releasing them. The leading edge portion 30 and the transition edge portion 32 of the perimeter edge 26 of the invention are formed using a laser cutting apparatus, and this shaping is most successfully performed using a laser cutting apparatus that provides six axes of movement or orientation with respect to the material of the knife being shaped by the cutting apparatus. It is such apparatus that permits the edge portions of the knife to be cut at a bevel angle with respect to the major faces of the blade 10. Further, the use of this type of cutting apparatus enables the creation of a transition edge portion 32 of the perimeter edge that is not characterized by a confined angular corner, but instead features a curved and relatively open profile that more easily sheds crop materials than a tight corner configuration. The six axis laser cutting apparatus thus facilitates the shaping of the unique profile of the teeth of the knife 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A knife for cutting crop materials, comprising:
   a base portion, the base portion having an interior edge and a pair of end edges, the base portion having an exterior region opposite the interior edge, the base portion having opposite major faces; and
   a plurality of teeth extending from the base portion, each tooth of the plurality of teeth being defined by a perimeter edge, the perimeter edge of the tooth including:
      a leading edge portion;
      a transition edge portion extending between the leading edge portion of the tooth and an adjacent tooth; and
      a trailing edge portion, the trailing edge portion extending between the leading edge portion of the tooth and an adjacent tooth of the plurality of teeth;
   wherein the leading edge portion is formed by a leading edge surface, the leading edge surface lying substantially in a plane that is oriented at a first bevel angle with respect to one of the major faces;
   wherein the transition edge portion is formed by a transition edge surface, the transition edge surface being oriented with respect to one of the major faces at a second bevel angle;
   wherein the trailing edge portion is formed by a trailing edge surface, the trailing edge surface being oriented substantially perpendicular to the major faces;
   wherein the transition edge portion is curved in a side profile of the tooth;
   wherein the trailing edge surface of each tooth extends from the leading edge surface of the tooth to the transition edge surface of an adjacent tooth.

2. The knife of claim 1 wherein the base portion and the plurality of teeth are formed of a material having a thickness equal to or less than approximately the thickness of 7 gauge.

3. The knife of claim 1 wherein the first bevel angle is greater than zero degrees and less than 90 degrees.

4. The knife of claim 1 wherein the first bevel angle is approximately 45 degrees.

5. The knife of claim 1 wherein the second bevel angle is substantially equal to the first bevel angle.

6. The knife of claim 1 wherein the leading edge portion is substantially straight in a side profile of the tooth.

7. A knife for cutting crop materials, comprising:
   a base portion, the base portion having an interior edge and a pair of end edges, the base portion having an exterior region opposite the interior edge, the base portion having opposite major faces; and
   a plurality of teeth extending from the base portion, each tooth of the plurality of teeth being defined by a perimeter edge, the perimeter edge of the tooth including:
      a leading edge portion;
      a transition edge portion extending between the leading edge portion of the tooth and an adjacent tooth; and
      a trailing edge portion, the trailing edge portion extending between the leading edge portion of the tooth and an adjacent tooth of the plurality of teeth;
   wherein the leading edge portion is formed by a leading edge surface, the leading edge surface lying substantially in a plane that is oriented at a first bevel angle with respect to one of the major faces;
   wherein the transition edge portion is formed by a transition edge surface, the transition edge surface being oriented with respect to one of the major faces at a second bevel angle;
   wherein the trailing edge portion is formed by a trailing edge surface, the trailing edge surface being oriented substantially perpendicular to the major faces;
   wherein the transition edge portion is curved in a side profile of the tooth;
   wherein each tooth of the plurality of teeth includes a tip located at a juncture of the leading edge portion and trailing edge portion, the tip defining a tip line, the tip line being oriented at a non-perpendicular angle with respect to the major faces.

8. The knife of claim 1 wherein the trailing edge portion is substantially linear from the transition edge portion to the leading edge portion.

9. The knife of claim 1 wherein the trailing edge portion is substantially planar from the transition edge portion to the leading edge portion.

10. A knife for cutting crop materials, comprising:
    a base portion, the base portion having an interior edge and a pair of end edges, the base portion having an exterior region opposite the interior edge, the base portion having opposite major faces; and
    a plurality of teeth extending from the base portion, each tooth of the plurality of teeth being defined by a perimeter edge, the perimeter edge of the tooth including:
       a leading edge portion;
       a transition edge portion extending between the leading edge portion of the tooth and an adjacent tooth; and
       a trailing edge portion, the trailing edge portion extending between the leading edge portion of the tooth and an adjacent tooth of the plurality of teeth;
    wherein the leading edge portion is formed by a leading edge surface, the leading edge surface lying substantially in a plane that is oriented at a first bevel angle with respect to one of the major faces;

wherein the transition edge portion is formed by a transition edge surface, the transition edge surface being oriented with respect to one of the major faces at a second bevel angle;

wherein the trailing edge portion is formed by a trailing edge surface, the trailing edge surface being oriented substantially perpendicular to the major faces;

wherein the transition edge portion is curved in a side profile of the tooth;

wherein the trailing edge portion occupies an entirety of the perimeter edge between the transition edge portion and the leading edge portion.

11. The knife of claim 1 wherein the trailing edge portion is blunt.

12. The knife of claim 1 wherein the first bevel angle of each leading edge portion of the plurality of teeth and the second bevel angle of each transition edge portion of the plurality of teeth are angled from a same one of the major faces of the base portion.

13. The knife of claim 1 wherein the base portion and the plurality of teeth are formed of a material having a thickness equal to or less than approximately the thickness of 7 gauge;
  wherein the first bevel angle is approximately 45 degrees;
  wherein the second bevel angle is substantially equal to the first bevel angle;
  wherein the leading edge portion is substantially straight in a side profile of the tooth;
  wherein the perimeter edge of each tooth of the plurality of teeth includes a trailing edge portion, the trailing edge portion extending between the leading edge portion of the tooth and an adjacent tooth of the plurality of teeth;
  wherein the trailing edge portion is formed by a trailing edge surface, the trailing edge surface being oriented substantially perpendicular to the major faces;
  wherein the trailing edge surface of each tooth extends from the leading edge surface of the tooth to the transition edge surface of an adjacent tooth, the trailing edge portion occupying an entirety of the perimeter edge between the transition edge portion and the leading edge portion, the trailing edge portion being substantially planar from the transition edge portion to the leading edge portion; and
  wherein the first bevel angle of each leading edge portion of the plurality of teeth and the second bevel angle of each transition edge portion of the plurality of teeth are angled from a same one of the major faces of the base portion.

14. A knife for cutting crop materials, comprising:
  a base portion having an interior edge and a pair of end edges, the base portion having an exterior region opposite the interior edge, the base portion having opposite major faces; and
  a plurality of teeth extending from the base portion, each tooth of the plurality of teeth being defined by a perimeter edge, the perimeter edge of the tooth including:
    a leading edge portion including a leading edge surface;
    a trailing edge portion including a trailing edge surface; and
    a transition edge portion including a transition edge surface, the transition edge portion extending between the leading edge portion of the tooth and the trailing edge portion of the tooth; and
  wherein, the leading edge surface lies in a plane that is oriented at a first bevel angle with respect to one of the major faces;
  wherein the transition edge surface is oriented with respect to one of the major faces at a second bevel angle;
  wherein the trailing edge surface is oriented perpendicular to the major faces; and
  wherein the transition edge portion being curved in a side profile of the tooth;
  wherein at least one tooth of the plurality of teeth includes a tip located at a juncture of the leading edge portion and trailing edge portion, the tip defining a tip line, the tip line being oriented at a non-perpendicular angle with respect to the major faces.

15. The knife of claim 14 wherein the first bevel angle is greater than zero degrees and less than 90 degrees.

16. The knife of claim 14 wherein the first bevel angle is approximately 45 degrees.

17. The knife of claim 14 wherein the second bevel angle is substantially equal to the first bevel angle.

18. The knife of claim 14 wherein the leading edge portion is substantially straight in a side profile of the tooth.

19. The knife of claim 10 wherein the first bevel angle is greater than zero degrees and less than 90 degrees.

20. The knife of claim 10 wherein the first bevel angle is approximately 45 degrees.

* * * * *